(12) United States Patent
Yeh

(10) Patent No.: US 8,386,698 B2
(45) Date of Patent: Feb. 26, 2013

(54) DATA ACCESSING METHOD FOR FLASH MEMORY AND STORAGE SYSTEM AND CONTROLLER USING THE SAME

(75) Inventor: Chih-Kang Yeh, Kinmen County (TW)

(73) Assignee: Phison Electronics Corp., Miaoli (TW)

( * ) Notice: Subject to any disclaimer, the term of this patent is extended or adjusted under 35 U.S.C. 154(b) by 467 days.

(21) Appl. No.: 12/277,566

(22) Filed: Nov. 25, 2008

(65) Prior Publication Data

US 2010/0011154 A1    Jan. 14, 2010

(30) Foreign Application Priority Data

Jul. 8, 2008    (TW) ................................ 97125741 A

(51) Int. Cl.
*G06F 12/00*    (2006.01)
(52) U.S. Cl. ........................................................ 711/103
(58) Field of Classification Search ................... 711/103
See application file for complete search history.

(56) References Cited

U.S. PATENT DOCUMENTS

| | | | | |
|---|---|---|---|---|
| 2005/0030791 A1* | 2/2005 | Liang et al. | .............. | 365/185.11 |
| 2008/0091901 A1* | 4/2008 | Bennett et al. | ................. | 711/165 |
| 2008/0109589 A1* | 5/2008 | Honda | ........................... | 711/103 |
| 2008/0189490 A1* | 8/2008 | Cheon et al. | ................... | 711/144 |
| 2008/0222350 A1* | 9/2008 | Chang | ............................ | 711/103 |
| 2009/0006725 A1* | 1/2009 | Ito et al. | ......................... | 711/103 |
| 2009/0037648 A1* | 2/2009 | Park et al. | ...................... | 711/103 |
| 2009/0049229 A1* | 2/2009 | Honda et al. | ................... | 711/101 |

OTHER PUBLICATIONS

Jesung Kim, Jong Min Kim, Sam H. Noh, Sang Lyul Min and Yookun Cho, A Space-Efficient Flash Translation Layer for Compactflash Systems, IEEE Transactions on Consumer Electronics, vol. 48, No. 2, May 2002 pp. 366-375.*

* cited by examiner

*Primary Examiner* — Kaushikkumar Patel
(74) *Attorney, Agent, or Firm* — J.C. Patents

(57) ABSTRACT

A data accessing method for a flash memory and a storage system and a controller using the same are provided. The data accessing method includes grouping a plurality of physical blocks of the flash memory into a data area, a spare area, and a random area and when a write command and a new data to be written are received from a host, determining whether the new data is a continuous data, wherein the new data is written temporarily into the physical blocks in the random area if the new data is not a continuous data. Thereby, the number of data moving and physical block erasing is reduced and accordingly the data accessing speed in a random writing mode is increased.

23 Claims, 6 Drawing Sheets

| R1 | P3 | 0 | 1 | L1 | 2 |
|---|---|---|---|---|---|
| | ⋮ | ⋮ | ⋮ | ⋮ | ⋮ |

DATA ACCESSING METHOD FOR FLASH MEMORY AND STORAGE SYSTEM AND CONTROLLER USING THE SAME

CROSS-REFERENCE TO RELATED APPLICATION

This application claims the priority benefit of Taiwan application serial no. 97125741, filed on Jul. 8, 2008. The entirety of the above-mentioned patent application is hereby incorporated by reference herein and made a part of this specification.

BACKGROUND

1. Technology Field

The present invention generally relates to a data accessing method, and more particularly, to a data accessing method for a flash memory and a storage system and a controller using the same.

2. Description of Related Art

Along with the widespread of digital cameras, camera phones, and MP3 in recently years, the consumers' demand to storage media has increased drastically too. Flash memory is one of the most adaptable memories for such battery-powered portable products due to its characteristics such as data non-volatility, low power consumption, small volume, and non-mechanical structure. A memory card is a storage device which uses a NAND flash memory as its storage medium. Memory card has been broadly adopted for storing personal data due to its small volume, large storage capacity, and high portability. Thereby, flash memory has become one of the most focused electronic products in recent years.

Generally speaking, a flash memory in a flash memory storage system is divided into a plurality of physical blocks, and these physical blocks are grouped into a data area and a spare area. Physical blocks in the data area store valid data written by write commands, and physical blocks in the spare area are used for substituting the physical blocks in the data area when the write commands are executed. To be specific, when a flash memory storage system receives a write command from a host and is about to write data into a physical block in the data area, the flash memory storage system selects a physical block from the spare area and writes valid data stored in the physical block of the data area and the new data into the physical block selected from the spare area. After that, the flash memory storage system links the physical block containing the new data to the data area, and erases the original physical block in the data area and links it to the spare area.

In order to allow a host to access physical blocks used alternatively for storing data, a flash memory storage system provides logical blocks to the host for accessing data. To be specific, the flash memory storage system maintains a logical-physical block mapping table for recording the mappings between the logical blocks and the physical blocks in the data area. Meanwhile, when the flash memory storage system executes a write command and accordingly switches a physical block in the data area and a physical block in the spare area, the flash memory storage system updates the logical-physical block mapping table so that subsequently the host can access data correctly.

However, in the technique described above, if the host repeatedly requests the flash memory storage system to write small quantity of data into different logical blocks, the flash memory storage system has to execute foregoing operations such as selecting a physical block from the spare area, moving data, and erasing the physical block constantly. As a result, the flash memory storage system spends a lot of time on data moving and physical block erasing, and accordingly, the performance of the flash memory storage system is affected.

SUMMARY

Accordingly, the present invention is directed to a data accessing method which can reduce the number of data moving and physical block erasing and accordingly increase the data accessing speed of a flash memory storage system in a random writing mode.

The present invention is directed to a controller which accesses a flash memory through foregoing data accessing method such that the number of data moving and physical block erasing is reduced and accordingly the data accessing speed of a flash memory storage system in a random writing mode is increased.

The present invention is further directed to a storage system which accesses a flash memory through foregoing data accessing method such that the number of data moving and physical block erasing is reduced and accordingly the data accessing speed of the storage system in a random writing mode is increased.

The principle aspect of the present invention provides a data accessing method for a flash memory, wherein the flash memory has a plurality of physical blocks. The data accessing method includes grouping the physical blocks into a data area, a spare area, and a random area; determining whether a new data to be written is a continuous data when a write command and the new data are received from a host; selecting one of the physical blocks from the spare area as a substitute physical block corresponding to a physical block for writing the new data and writing the new data into the substitute physical block when the new data is a continuous data; and temporarily writing the new data into a physical block in the random area when the new data is not a continuous data.

The additional aspect of the present invention provides a storage system including a flash memory, a connector, and a controller, wherein the flash memory has a plurality of physical blocks. The controller is electrically connected to the flash memory and the connector. The controller includes a microprocessor unit, a flash memory interface, a buffer memory, and a memory management module. The flash memory interface, the buffer memory, and the memory management module are electrically connected to the microprocessor unit. The memory management module has a plurality of machine instructions which can be executed by the microprocessor unit to implement the aforementioned data accessing method to the flash memory.

According to the present invention, a random area is further set up among the physical blocks of a flash memory, and discontinuous new data is temporarily written into the random area. Thereby, the number of data moving and physical block erasing is reduced and accordingly the data accessing speed in a random writing mode is increased.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

FIG. 3 illustrates an example of a random area index table according to an exemplary embodiment of the present invention.

DESCRIPTION OF THE EXEMPLARY EMBODIMENTS

Figure 1:
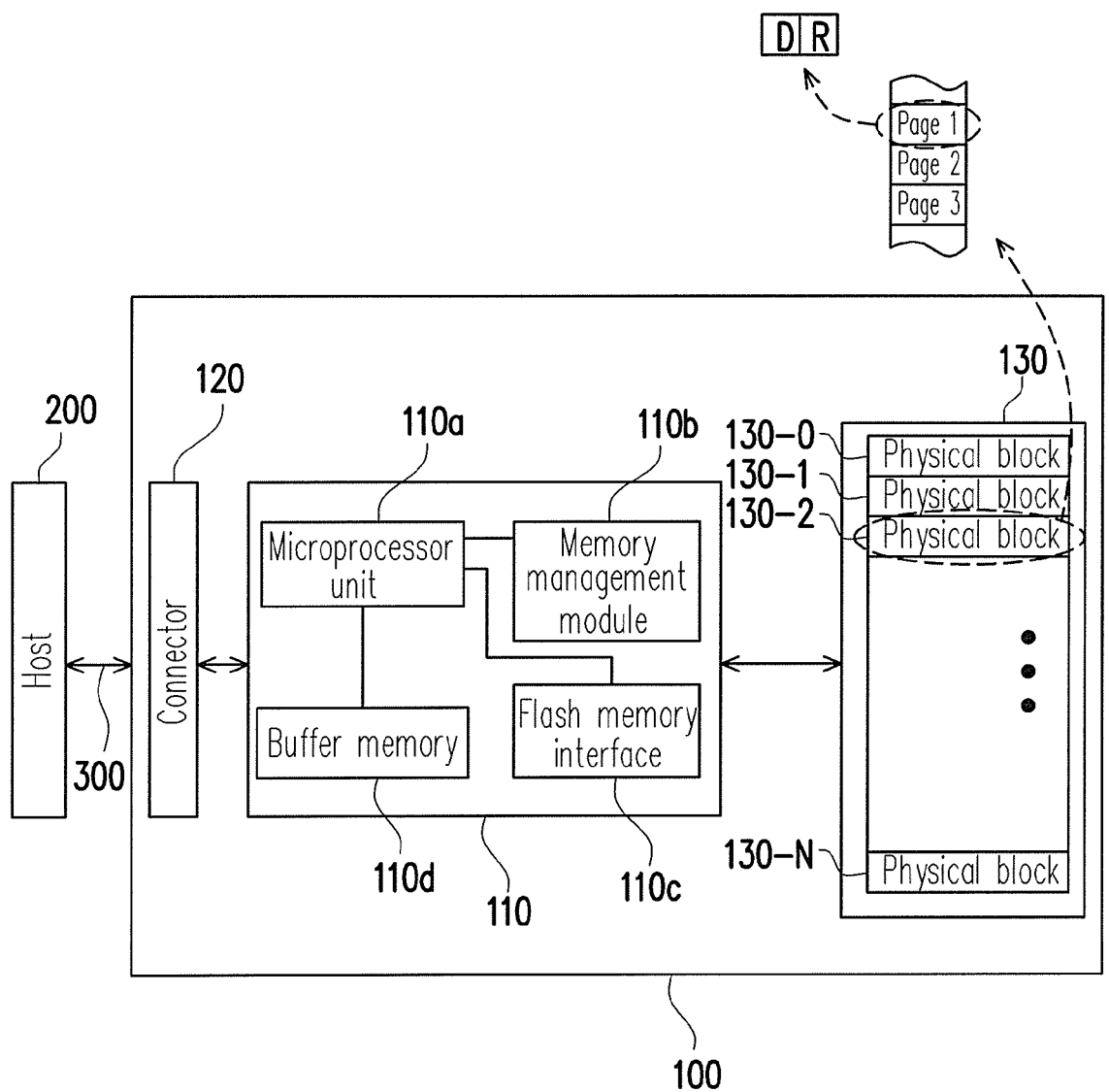
FIG. 1 is a schematic block diagram of a flash memory storage system according to an exemplary embodiment of the present invention.

Reference will now be made in detail to the present preferred exemplary embodiments of the invention, examples of which are illustrated in the accompanying drawings. Wherever possible, the same reference numbers are used in the drawings and the description to refer to the same or like parts.

FIG. 1 is a schematic block diagram of a flash memory storage system according to an exemplary embodiment of the present invention. Referring to FIG. 1, the flash memory storage system 100 includes a controller 110, a connector 120, and a flash memory 130.

The flash memory storage system 100 usually works together with a host 200 to allow the host 200 to write data into or read data from the flash memory storage system 100. In the present exemplary embodiment, the flash memory storage system 100 is a solid state drive (SSD). However, in another exemplary embodiment of the present invention, the flash memory storage system 100 may also be a flash memory card or a flash drive.

The controller 110 executes a plurality of instructions implemented in hardware or firmware to cooperate with the connector 120 and the flash memory 130 for storing, reading, and erasing data. The controller 110 includes a microprocessor unit 110a, a memory management module 110b, a flash memory interface 110c, and a buffer memory 110d.

The microprocessor unit 110a coordinates with the memory management module 110b, the flash memory interface 110c, and the buffer memory 110d to carry out various operations of the flash memory storage system 100.

Figure 4:
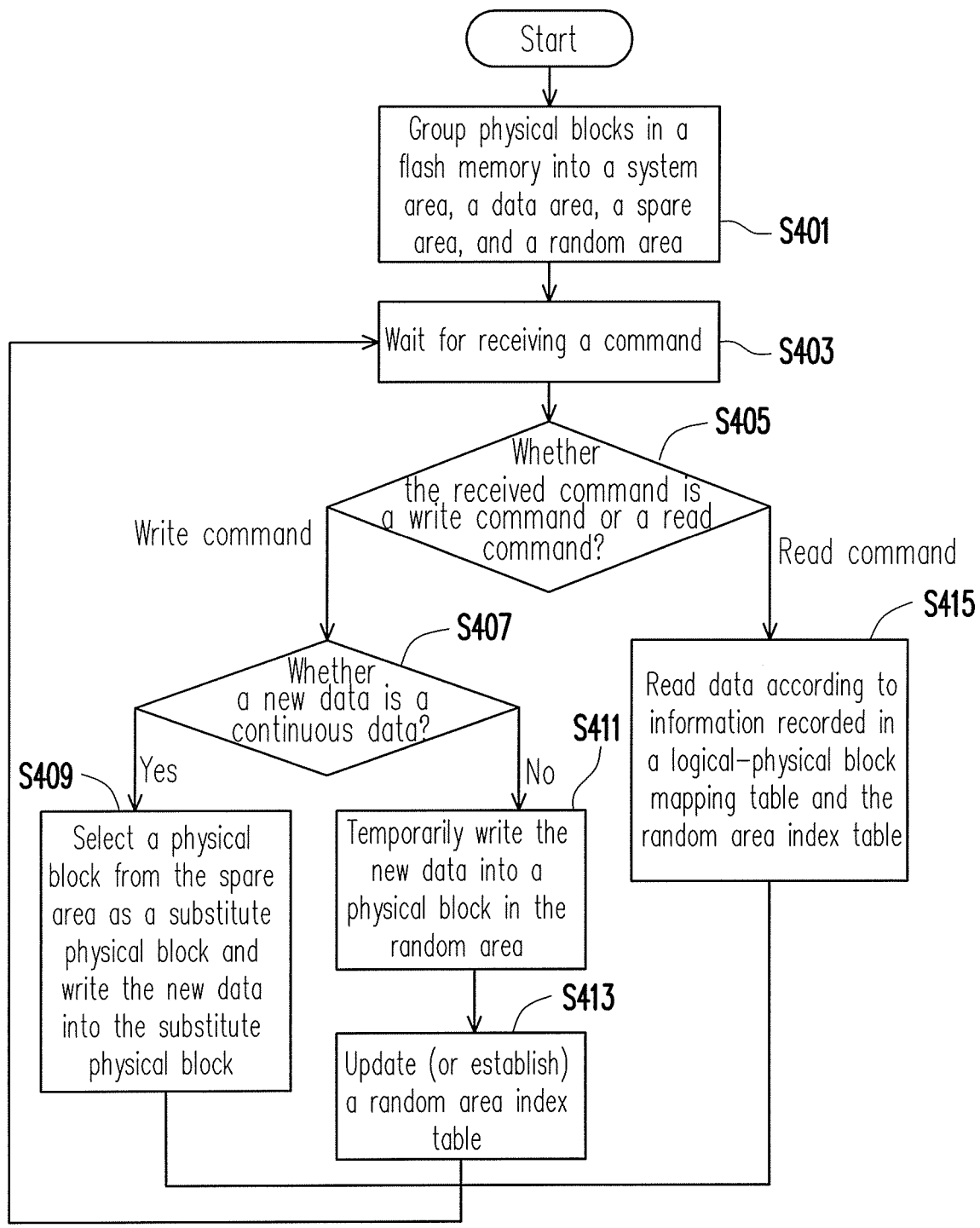
FIG. 4 is a flowchart of a data accessing method according to an exemplary embodiment of the present invention.

The memory management module 110b is electrically connected to the microprocessor unit 110a. The memory management module 110b has a plurality of machine instructions which can be executed by the microprocessor unit 110a to manage the flash memory 130, such as to execute a wear leveling function, to manage bad blocks, or to maintain a logical-physical block mapping table, etc. Particularly, in the present exemplary embodiment, the memory management module 110b includes machine instructions for accomplishing the data accessing steps in the present exemplary embodiment (as shown in FIG. 4).

In the present exemplary embodiment, the memory management module 110b is implemented in the controller 110 as a firmware. For example, the memory management module 110b can be implemented by coding program-related machine instructions with a programming language and storing the machine instructions into a program memory (for example, a read only memory (ROM)). When the flash memory storage system 100 is in operation, the machine instructions of the memory management module 110b are loaded into the buffer memory 110d and executed by the microprocessor unit 110a to accomplish foregoing wear leveling, bad block managing, or logical-physical block mapping table maintaining functions, in particular, the data accessing function in the present exemplary embodiment (as shown in FIG. 4).

In another exemplary embodiment of the present invention, the machine instructions of the memory management module 110b may also be stored in a specific area of the flash memory 130 (for example, the following system area 202) as a firmware. Similarly, when the flash memory storage system 100 is in operation, the machine instructions of the memory management module 110b are loaded into the buffer memory 110d and executed by the microprocessor unit 110a. Additionally, in another exemplary embodiment of the present invention, the memory management module 110b may also be implemented in the controller 110 as a hardware.

The flash memory interface 110c is electrically connected to the microprocessor unit 110a for accessing the flash memory 130. Namely, data to be written by the host 200 into the flash memory 130 is converted by the flash memory interface 110c into a format acceptable to the flash memory 130.

The buffer memory 110d is electrically connected to the microprocessor unit 110a for temporarily storing system data (for example, the logical-physical block mapping table) or data to be read or written by the host 200. In the present exemplary embodiment, the buffer memory 110d is a static random access memory (SRAM). However, the present invention is not limited thereto, and a dynamic random access memory (DRAM), a magnetoresistive random access memory (MRAM), a phase change random access memory (PRAM), or other suitable memories may also be applied to the present invention.

In addition, the controller 110 may further include other general function modules such as an error correction module (not shown) and a power management module (not shown) for controlling the flash memory.

The connector 120 is used for connecting to the host 200 through a bus 300. In the present exemplary embodiment, the connector 120 is a PCI Express connector. However, the present invention is not limited thereto, and the connector 120 may also be a USB connector, an IEEE 1394 connector, a SATA connector, a MS connector, a MMC connector, a SD connector, a CF connector, an IDE connector, or other suitable data transmission connectors.

The flash memory 130 is electrically connected to the controller 110 for storing data. The flash memory 130 is substantially divided into a plurality of physical blocks 130-0~130-N. Generally speaking, in a flash memory, data is erased in unit of physical blocks. Namely, each physical block contains the smallest number of memory cells which are erased together. Each physical block is usually divided into a plurality of pages. A page is usually the smallest programming unit. However, it should be noted that in some different flash memory designs, the smallest programming unit may also be a sector. Namely, a page has a plurality of sectors and each sector is served as the smallest programming unit. In other words, page is the smallest unit for reading and writing data. Each page is usually divided into a user data area D and a redundant area R, wherein the user data area D is used for storing user data, and the redundant area R is used for storing system data (for example, an error correcting code (ECC)).

Generally, the user data area D has 512 bytes and the redundant area R has 16 bytes in order to correspond to the size of sectors in a disk drive. In other words, a page is a sector. However, a page may also be composed of a plurality of sectors. For example, a page may be composed of four sectors.

Generally, a physical block can be composed of any number of pages, such as 64 pages, 128 pages, and 256 pages. The physical blocks 130-0~130-N are usually grouped into several zones. By managing operations of a flash memory based on zones, parallelism of the operations can be increased and the management thereof can be simplified.

Figure 2A:
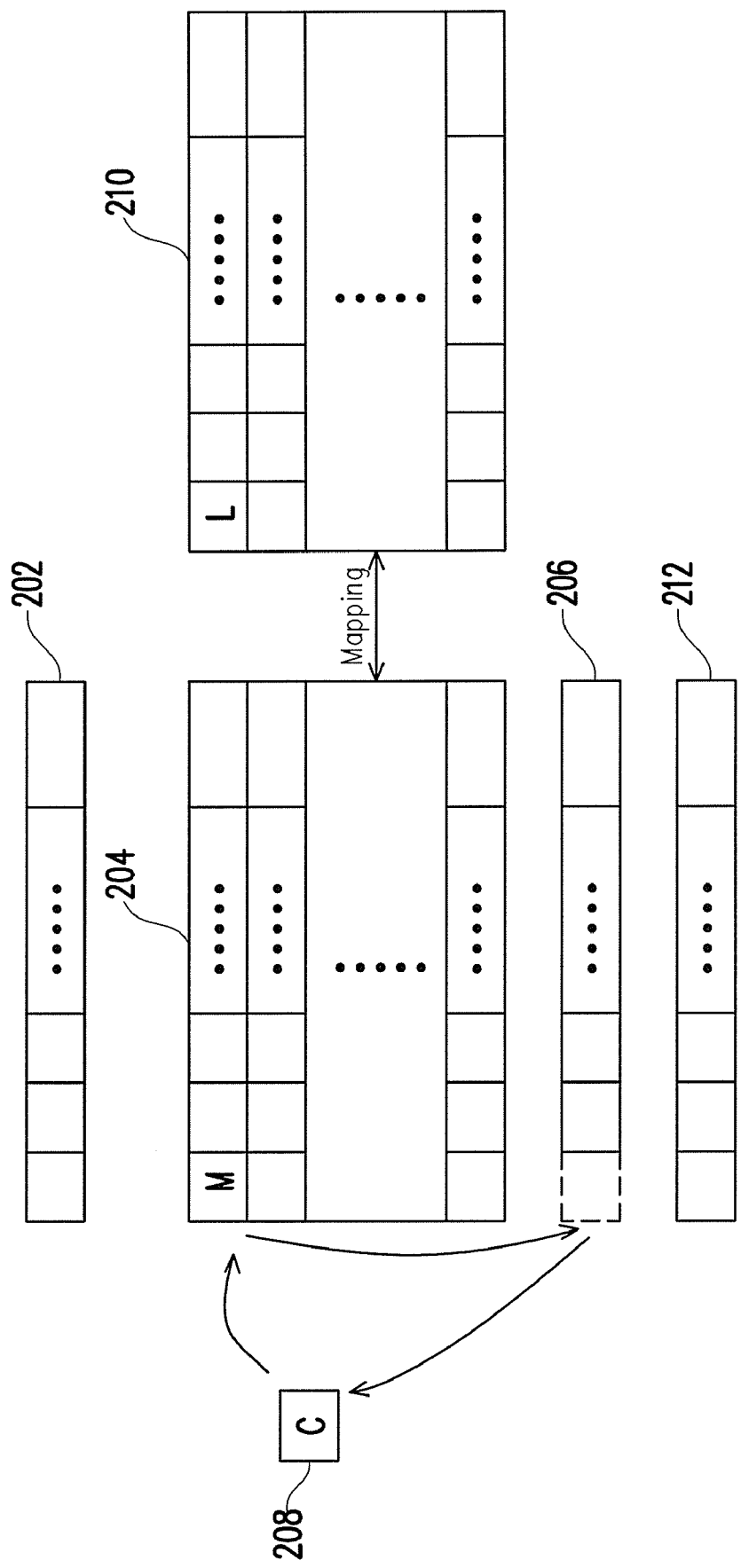
FIG. 2A and FIG. 2B are diagrams illustrating how physical blocks in a flash memory are alternated according to an exemplary embodiment of the present invention.
Figure 2B:
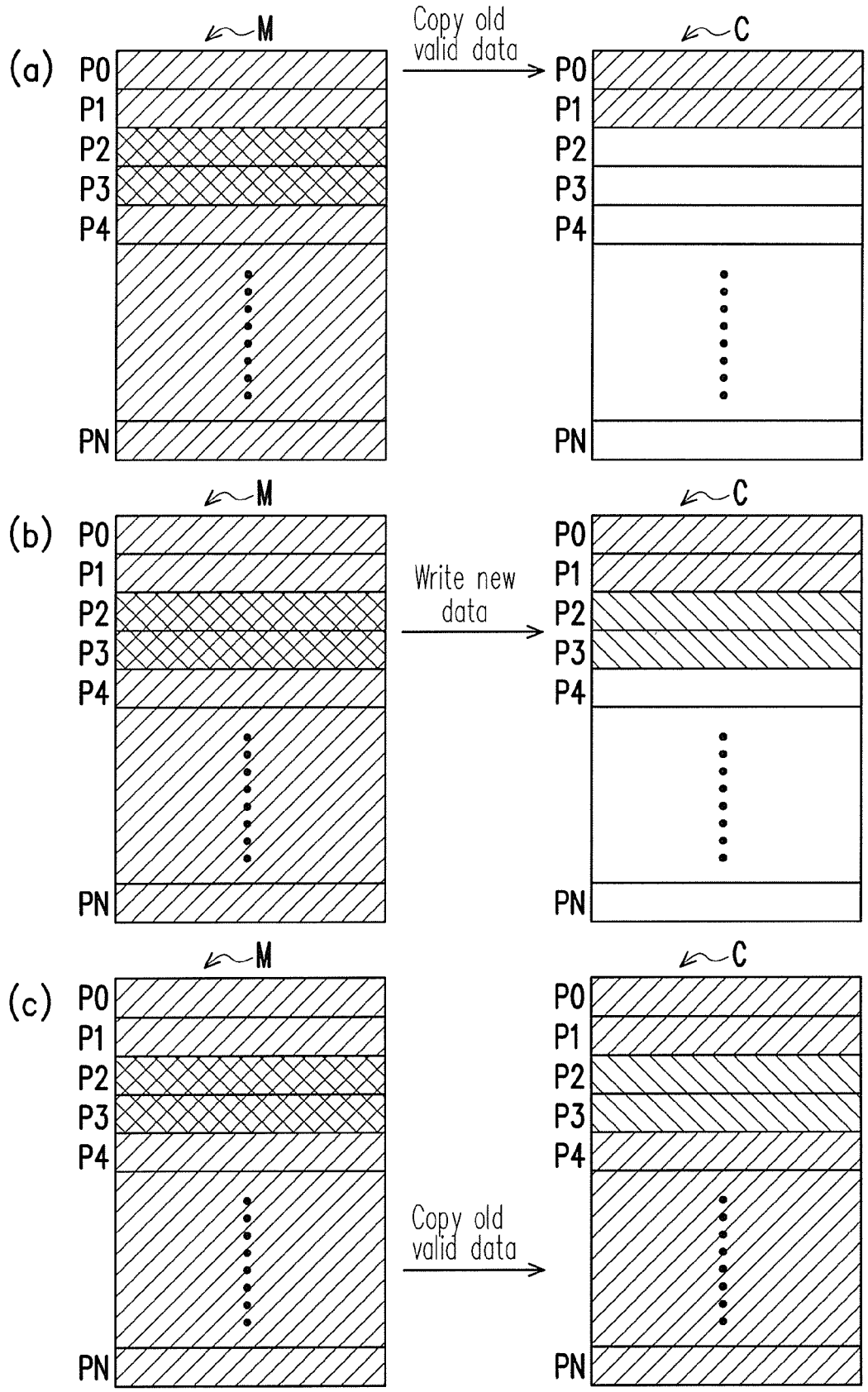

FIG. 2A and FIG. 2B are diagrams illustrating how physical blocks in a flash memory are alternated according to an exemplary embodiment of the present invention.

It should be understood that in following descriptions, terms like "select", "move", "substitute", "divide", and "group" are only used for describing the operations performed on the physical blocks 130-0~130-N in the flash memory 130 in a logical concept. In other words, the physical positions of the blocks in the flash memory are not changed; instead, the operations are logically performed on the physical blocks in the flash memory. It should be mentioned herein that the following operations performed to the physical blocks are carried out by the controller 110 by executing the machine instructions of the memory management module 110b.

Referring to FIG. 2A, in the present exemplary embodiment, in order to program (i.e., write and erase) the flash memory 130 more efficiently, the controller 110 logically groups the physical blocks 130-1~130-N in the flash memory 130 into a system area 202, a data area 204, and a spare area 206. Generally, more than 90% of the physical blocks in the flash memory 130 belong to the data area 204. As described above, the physical blocks 130-1~130-N in the flash memory 130 are alternatively provided to the host for storing data. Thus, the controller 110 provides logical blocks 210 to the host for accessing data, and the controller 110 records the physical blocks corresponding to the logical blocks by maintaining a logical-physical block mapping table.

Physical blocks in the system area 202 are used for recording system data, such as the number of zones in the flash memory 130, the number of physical blocks in each zone, the number of pages in each physical block, and a logical-physical block mapping table for recording the corresponding relationship between logical blocks and physical blocks, etc.

Physical blocks in the data area 204 are used for storing user data. Generally, these physical blocks are the blocks corresponding to the logical block 210 accessed by the host 200.

Physical blocks in the spare area 206 are used for substituting the physical blocks in the data area 204. Thus, the physical blocks in the spare area 206 are blank or available blocks, namely, no data is recorded in these blocks or data recorded in these blocks has been marked as invalid data.

To be specific, since each address in a flash memory can only be programmed once, an erasing operation has to be performed before writing data to an address which already contains a data. However, as described above, data is written into a flash memory in unit of pages while erased from the same in unit of blocks. Since the wiring unit is smaller than the erasing unit, valid pages in a physical block have to be copied into another physical block before erasing data from this physical block.

For example, when the host is about to write a data into a logical block L in the logical block 210, the controller 110 gets to know through the logical-physical block mapping table that the logical block L is currently mapped to a physical block M in the data area 204. Thus, the flash memory storage system 100 updates the data in the physical block M. Meanwhile, the controller 110 selects a physical block C from the spare area 206 for substituting the physical block M in the data area 204. However, when the new data is written into the physical block C, not all the valid data in the physical block M is instantly moved to the physical block C to erase the physical block M. To be specific, the controller 110 copies the valid data (i.e., pages P0 and P1) in the physical block M before the page for writing the new data into the physical block C (as shown in FIG. 2B(a)) and writes the new data (i.e., the pages P2 and P3 in the physical block C) into the physical block C (as shown in FIG. 2B(b)). Herein, the physical block C containing part of the old valid data and the new data is temporarily linked as a substitute physical block 208. This is because the valid data in the physical block M may become invalid in the next operation (for example, a writing command), and accordingly instantly moving all the valid data in the physical block M to the physical block C may become meaningless. In the present example, the combination of the contents in the physical block M and the physical block C is the content of the corresponding logical block L. The number of such a temporary mother-child (i.e., the physical block M and the physical block C) relationship can be determined according to the size of the buffer memory 110d in the controller 110. For example, five sets of mother-child blocks are usually adopted. The operation for temporarily maintaining such a relationship is usually referred as opening mother-child blocks.

Thereafter, the controller 110 integrates the physical block M and the physical block C into one block only when the contents in the physical block M and the physical block C are to be actually combined, so that the efficiency in using these blocks can be improved. Such an integration operation is also referred as closing mother-child blocks. For example, as shown in FIG. 2B(c), to close these mother-child blocks, the controller 110 copies the remaining valid data in the physical block M (i.e. pages P4~PN) to the physical block C and then erases the physical block M and links the physical block M to the spare area 206. At the same time, the controller links the physical block C to the data area 204 and updates the logical-physical block mapping table to show that the logical block L is mapped to the physical block C. By now, the mother-child blocks are closed.

Because the programming specification of the flash memory 130 requests that data has to be written into each physical block from the first page to the last page and each bit can only be programmed once (i.e., can only be changed from "1" to "0"), once data is written into a page of a physical block, a physical block has to be selected from the spare area 206 and the steps illustrated in FIG. 2B have to be performed again to update the data, as shown in FIG. 2A. Thus, when the newly moved data (for example, the pages P0~P1 in FIG. 1B) has to be updated before the closing operation is performed as shown in FIG. 2B(c) (i.e., the physical blocks are still in the temporary state as shown in FIG. 2B(b)), the old data which has been moved has to be moved again, and this is referred as a random writing mode.

For example, a file allocation table (FAT) is usually used in a storage device for managing the storage medium, wherein data in the FAT is accessed frequently. The random writing mode may be entered when the FAT is accessed and the newly moved data is frequently updated. While entering the random writing mode, the controller 110 sequentially writes new data into pages of the physical block C but does not perform the valid data moving as illustrated in FIG. 2B(a). The controller 110 only integrates the valid data when the random writing mode ends so that repeatedly performing the operations illustrated in FIG. 2A and FIG. 2B in the random writing can be avoided.

In the present exemplary embodiment, besides the system area 202, the data area 204, and the spare area 206, the controller 110 further executes the machine instructions of the memory management module 110*b* to group at least one physical block among the physical blocks 130-1~130-N of the flash memory 130 into a random area 212.

The random area 212 is used for temporarily storing data written by the host 200. To be specific, in the present exemplary embodiment, when a logical block to be written enters the random writing mode, and a physical block mapped to the logical block is engaged in the mother-child relationship, the data is sequentially written into a corresponding sub-block (for example, the physical block C) directly so as to avoid opening and closing the mother-child blocks repeatedly. However, when the random writing mode takes place in multiple logical blocks, namely, the host 200 constantly writes discontinuous data (i.e., data of small quantity) into different logical blocks, in the present exemplary embodiment, the controller 110 temporarily writes the data into a physical block of the random area 212 to avoid repeatedly opening and closing the mother-child blocks (as the operations illustrated in FIG. 2A and FIG. 2B) and accordingly affecting the performance of the flash memory storage system 100.

It should be mentioned that the host 200 determines whether to transmit the new data to be written to the flash memory storage system 100 with one or multiple write commands according to the maximum transmission quantity (the maximum data length to be written by each write command) of the connector 120. Thus, in the present exemplary embodiment, the controller 110 determines whether a new data to be written by a current write command is a continuous data or a discontinuous data according to whether the quantity of the new data is smaller than a predetermined value. For example, when the maximum transmission quantity between the host 200 and the connector 120 is 100 sectors and the quantity of the new data to be written is less than 100 sectors, the controller 110 determines the new data to be a discontinuous data; contrarily, the controller 110 determines the new data to be a continuous data.

Even though in the present invention, whether a new data is a discontinuous data is determined according to the quantity of the new data, the present invention is not limited thereto, and any other suitable method may also be applied in the present invention. For example, in another exemplary embodiment of the present invention, the host 200 may also transmit a continuous data to the flash memory storage system as several small data having their quantities smaller than the maximum transmission quantity. Thus, in this example, the controller can determine the first data it receives as a discontinuous data and store the data into the random area. The controller can determine that the data is a continuous data after it receives subsequent data and open the mother-child blocks to write the data.

In the present exemplary embodiment, since the new data may be temporarily stored in a physical block of the random area 212, the controller 110 generates a mark in the logical-physical block mapping table to indicate that the new data is temporarily written into the physical block in the random area 212, so that the controller 110 can look for the data in the random area 212 according to the mark when the host 200 is about to read the data in the logical block.

In addition, because the random area 212 is used for temporarily storing data for all the logical blocks, in the present exemplary embodiment, a random area index table is established for recording the pages and logical blocks to which the data stored in the physical blocks of the random area 212 belong.

Figure 3:
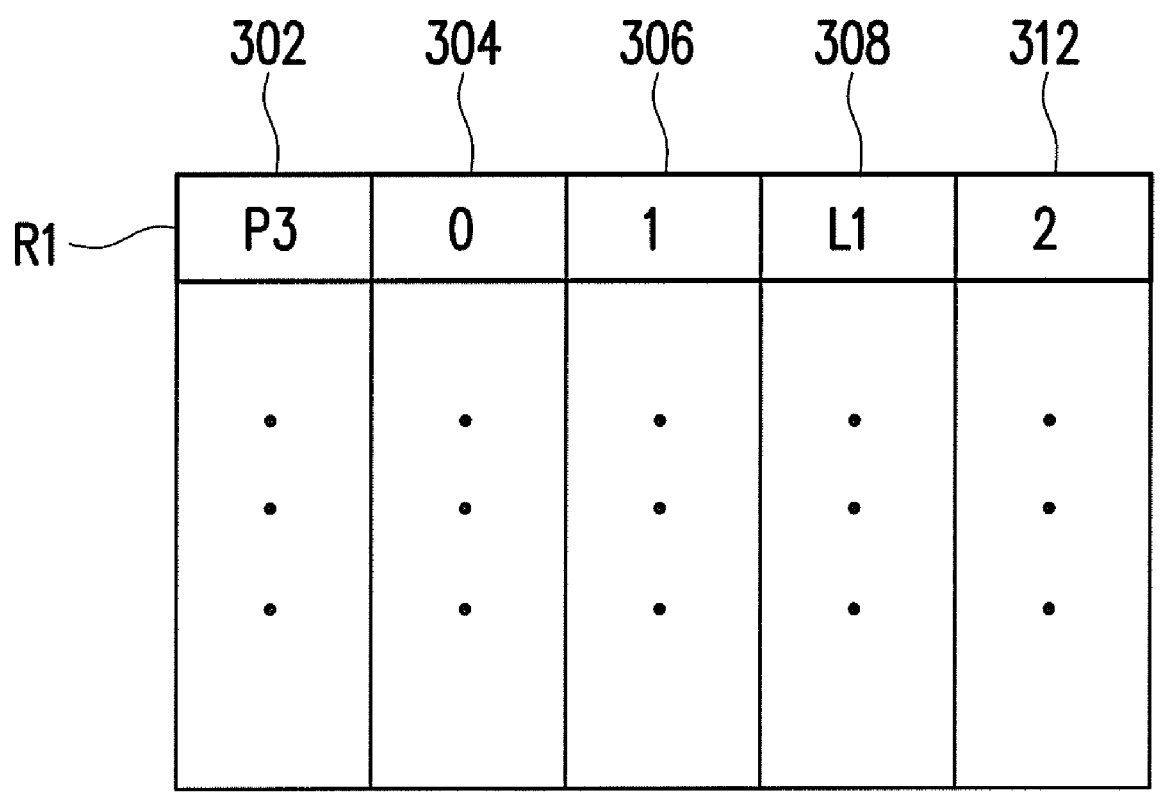

FIG. 3 illustrates an example of a random area index table according to an exemplary embodiment of the present invention. Referring to FIG. 3, the size of the random area index table 300 is determined according to the number of physical blocks in the random area 212. The random area index table 300 includes a random block index field 302, a page index field 304, a data validity field 306, a mapped logical block field 308, and a mapped page field 310. For example, when a new data in the page 2 of a logical block L1 is temporarily written into the page 0 of a physical block P3 in the random area 212, a record R1 in the random area index table has P3 in the random block index field 302, 0 in the page index field 304, 1 in the data validity field 306, L1 in the mapped logical block field 308, and 2 in the mapped page field 310, wherein the data validity field 306 having value 1 means that the page 0 of the physical block P3 in the random area 212 is valid. Besides, when the data validity field 306 has value 0, data stored in the page is invalid.

As described above, for the convenience of management, the physical blocks 130-0~130-N may also be divided into several independent zones, and an independent management mechanism is established regarding each of the zones, such as an independent logical-physical block mapping table and independent data area and spare area, etc. In particular, in an example wherein a flash memory is managed as several zones, the controller respectively disposes the random area in each of the zones so as to simplify the management. In addition, when random areas are respectively disposed in multiple zones, the random area in each of the zone may have different number of physical blocks.

FIG. 4 is a flowchart of a data accessing method according to an exemplary embodiment of the present invention. Below, the data accessing (writing and reading) steps in the present invention will be described in detail with reference to FIG. 4.

Referring to FIG. 4, in step S401, the controller 110 groups the physical blocks 130-0~130-N in the flash memory 130 into a system area 202, a data area 204, a spare area 206, and a random area 212.

In step S403, a command is received from the host 200, and in step S405, whether the command received from the host 200 is a write command or a read command is determined.

If it is determined in step S405 that the received command is a write command, then in step S407, whether a new data is a continuous data is determined. For example, the new data is determined to be a discontinuous data when the quantity of the new data is smaller than a predetermined value (for example, the maximum transmission quantity).

If it is determined in step S407 that the new data is a continuous data, then in step S409, a physical block is selected from the spare area 206 and served as a substitute physical block (for example, the physical block C) corresponding to the physical block for writing the new data (for example, the physical block M), and the new data is written into the substitute physical block. After that, the data accessing process returns to step S403 to receive the next command.

If it is determined in step S407 that the new data is not a continuous data, then in step S411, the new data is temporarily written into a physical block in the random area 212. Particularly, whether all the physical blocks in the random area 212 have been written may be further determined in step S411. If all the physical blocks in the random area 212 have been written, a physical block is selected from the spare area 206 and data in the physical block of the random area 212 and valid data in the corresponding physical block in the data area 204 are written into the selected physical block. Namely, when all the physical blocks in the random area 212 have been written, the controller 110 integrates the physical blocks to free the storage space of the random area 212 so that new data can be written.

In addition, only a limited number of mother-child blocks can be opened, namely, only a predetermined number of substitute physical blocks can be opened (for example, only five physical blocks can be used as the substitute physical blocks) at the same time. Thus, in another exemplary embodiment of the present invention, step S407 further includes determining whether the controller 110 has used the predetermined number of substitute physical blocks while determining whether the new data is a continuous data. Step S411 is executed only if the predetermined number of substitute physical blocks has been used, and step S409 is executed if there are still unused substitute physical blocks.

It should be understood that foregoing operation for releasing the storage space of the random area 212 may also be carried out at other suitable time. For example, this operation can be performed when the flash memory storage system 100 is turned on. In addition, in another exemplary embodiment of the present invention, the storage space of the random area 212 may also be released when a wear leveling program (or wear leveling procedure) is executed. For example, the erasing number of a physical block in the data area 204 corresponding to the data stored in the random area 212 is multiplied by a weight such that the corresponding physical block in the data area 204 can be first selected as the substitute physical block when the wear leveling program is executed. As a result, the data in the random area 212 can be integrated and accordingly the storage space of the random area 212 can be released. The detail for substituting the physical blocks in the wear leveling program is not the focus of the present invention therefore will not be described herein.

Thereafter, in step S413, a random area index table 300 is established or updated. After that, the data accessing process returns to the step S403 to receive the next command.

If it is determined in step S405 that the received command is a read command, then in step S415, data is read according to the information recorded in the logical-physical block mapping table and the random area index table. After that, the data accessing process returns to the step S403 to receive the next command.

Even though not shown in the figure, it should be understood by those skilled in the art that the data accessing process will be ended when the flash memory storage system 100 is removed from the host 200 or is turned off.

It should be mentioned that in the present exemplary embodiment, the logical-physical block mapping table and the random area index table are re-established in the buffer memory 110d by reading the information in the redundant area of each of the physical blocks when the flash memory storage system 100 is turned on. However, in another exemplary embodiment of the present invention, the logical-physical block mapping table and the random area index table may also be stored into the system area 202 of the flash memory 130 when the flash memory storage system 100 is turned off, so that when next time the flash memory storage system 100 is turned on, the logical-physical block mapping table and the random area index table can be loaded into the buffer memory 110d and accordingly the state before the flash memory storage system 100 is turned off can be quickly restored.

Figure 5:
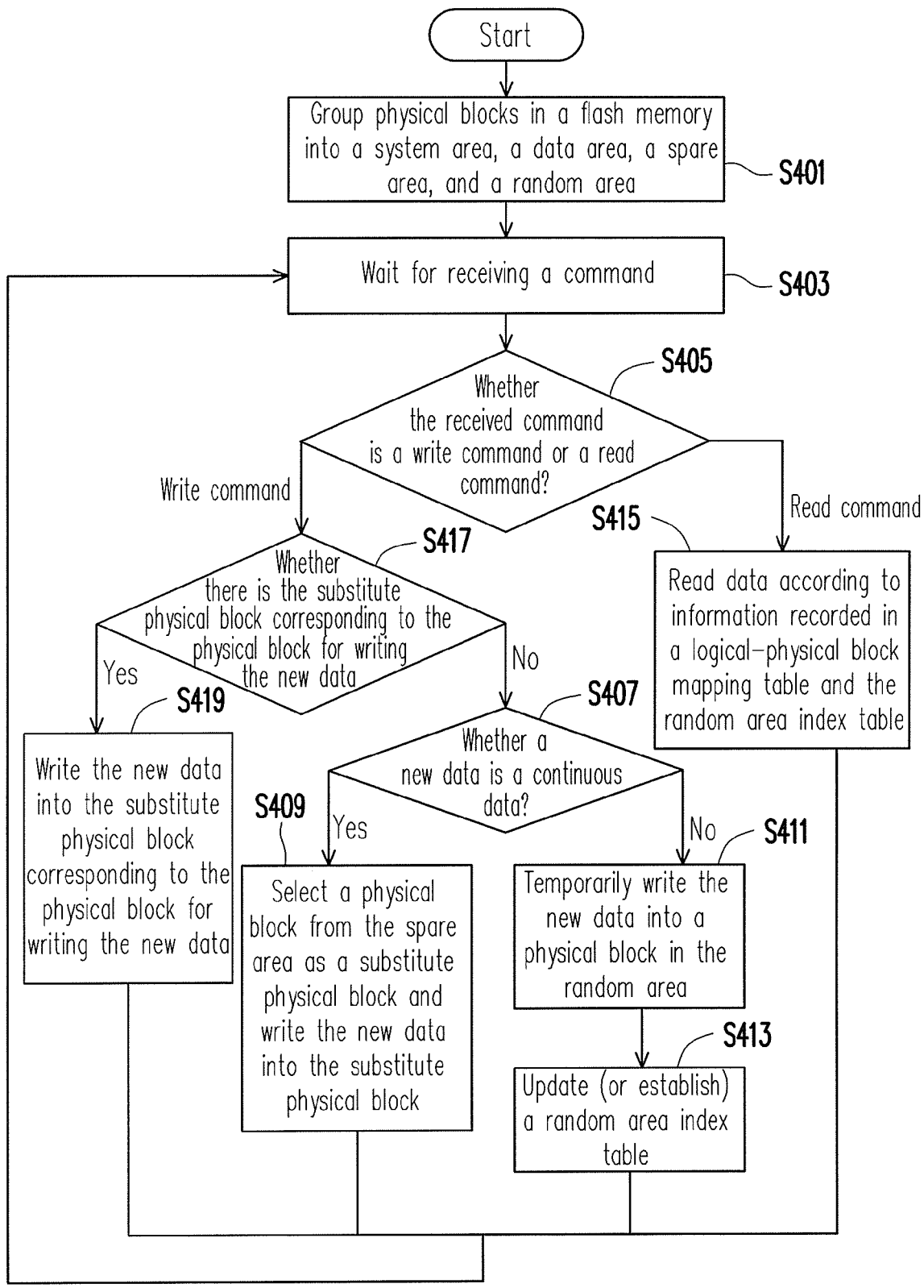
FIG. 5 is a flowchart of a data accessing method according to another exemplary embodiment of the present invention.

As described above, in the present exemplary embodiment, when a new data is received, the controller 110 directly determines whether the new data is a continuous data and accordingly carries out different operations. However, in the case that the physical block for writing the new data has already a corresponding substitute physical block (i.e., the mother-child blocks have been opened), since the corresponding substitute physical block has been previously selected, the new data can be written directly into the substitute physical block without considering whether the new data is a continuous data. Thus, in another exemplary embodiment of the present invention, the data accessing steps further include determining whether there is a substitute physical block corresponding to the physical block for writing the new data in the current flash memory storage system 100 before determining whether the new data is a continuous data. Namely, whether the physical block for writing the new data has a corresponding sub-block is first determined (step S417 in FIG. 5). If the physical block for writing the new data has corresponding sub-blocks, the new data is written into the substitute physical block corresponding to the physical block for writing the new data (step S419 in FIG. 5).

In overview, in the data accessing method provided by the present invention, a random area is further set up among the physical blocks of a flash memory, and discontinuous data is temporarily written into the random area. Thus, besides the physical block which already has a substitute physical block (i.e., the temporary mother-child relationship) and can enter a random writing mode, the number of data moving and block erasing operations may also be reduced to a physical block not engaged in the mother-child relationship by temporarily storing data into the random area, and accordingly the performance of the flash memory storage system in the random writing mode can be improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data accessing method, suitable for a flash memory, wherein the flash memory has a plurality of physical blocks, the data accessing method comprising:
    logically grouping the physical blocks into a data area, a spare area, and a random area;
    configuring a plurality of logical blocks to map to the physical blocks of the data area;
    determining whether a new data is a continuous data when a write command and the new data are received from a host, wherein the new data belongings to a first logical block among the logical blocks and a first physical block among the physical blocks of the data area maps to the first logical block;
    selecting one of the physical blocks from the spare area to serve as a substitute physical block corresponding to the first physical block and writing the new data into the substitute physical block when the new data is the continuous data;
    determining whether a number of physical blocks serving as the substitute physical block is a predetermined number when the new data is not the continuous data;
    temporarily writing the new data into one of the physical blocks in the random area when the number of the physical blocks serving as the substitute physical block is the predetermined number, wherein the one of the physical blocks in the random area stores data belonging to a plurality of logical blocks among the logical blocks; and
    selecting one of the physical blocks from the spare area as the substitute physical block corresponding to the first physical block and writing the new data into the substitute physical block when the number of the substitute physical block is not the predetermined number.

2. The data accessing method according to claim 1, wherein the step of determining whether the new data is the continuous data comprises determining that the new data is not the continuous data when a quantity of the new data is smaller than a predetermined value.

3. The data accessing method according to claim 1, further comprising determining whether there is the substitute physical block corresponding to the first physical block before determining whether the new data is the continuous data,
wherein when there is the substitute physical block corresponding to the first physical block, the new data is written into the substitute physical block corresponding to the first physical block.

4. The data accessing method according to claim 1, further comprising establishing and updating a random area index table to record information regarding data stored in each of the physical blocks in the random area.

5. The data accessing method according to claim 1, further comprising generating a mark in a record corresponding to the first physical block in a logical-physical block mapping table to indicate that the new data is temporarily written into the one of the physical blocks in the random area when the new data is temporarily written into the one of the physical blocks in the random area.

6. The data accessing method according to claim 1, further comprising selecting at least one of the physical blocks from the spare area and writing data stored in at least one of the physical blocks in the random area and valid data stored in a corresponding physical block in the data area into the at least one physical block selected from the spare area when the physical blocks in the random area are all written.

7. The data accessing method according to claim 1, wherein the step of logically grouping the physical blocks into the data area, the spare area, and the random area comprises:
dividing the physical blocks into a plurality of zones; and
individually grouping the physical blocks in each of the zones into the data area, the spare area, and the random area.

8. The data accessing method according to claim 7, wherein the random areas in the zones respectively have different numbers of physical blocks.

9. The data accessing method according to claim 1, further comprising merging valid data belonging to the first logical block from the data area, the spare area, and the random area to a new physical block.

10. A controller, suitable for a flash memory storage system having a flash memory, wherein the flash memory has a plurality of physical blocks, the controller comprising:
a microprocessor unit;
a flash memory interface, electrically connected to the microprocessor unit;
a buffer memory, electrically connected to the microprocessor unit; and
a memory management module, electrically connected to the microprocessor unit and having a plurality of machine instructions which can be executed by the microprocessor unit to perform a plurality of data accessing steps to the flash memory, wherein the data accessing steps comprise:
logically grouping the physical blocks into a data area, a spare area, and a random area;
configuring a plurality of logical blocks to map to the physical blocks of the data area;
determining whether a new data is a continuous data when a write command and the new data are received from a host, wherein the new data belongings to a first logical block among the logical blocks and a first physical block among the physical blocks of the data area maps to the first logical block;
selecting one of the physical blocks from the spare area to serve as a substitute physical block corresponding to the first physical block and writing the new data into the substitute physical block when the new data is the continuous data;
determining whether a number of physical blocks serving as the substitute physical block is a predetermined number when the new data is not the continuous data;
temporarily writing the new data into one of the physical blocks in the random area when the number of the physical blocks serving as the substitute physical block is the predetermined number, wherein the one of the physical blocks in the random area stores data belonging to a plurality of logical blocks among the logical blocks; and
selecting one of the physical blocks from the spare area as the substitute physical block corresponding to the first physical block and writing the new data into the substitute physical block when the number of the substitute physical block is not the predetermined number.

11. The controller according to claim 10, wherein the step of determining whether the new data is the continuous data comprises determining that the new data is not the continuous data when a quantity of the new data is smaller than a predetermined value.

12. The controller according to claim 10, wherein the data accessing steps further comprise determining whether there is the substitute physical block corresponding to the first physical block before determining whether the new data is the continuous data,
wherein when there is the substitute physical block corresponding to the first physical block, the new data is written into the substitute physical block corresponding to the first physical block.

13. The controller according to claim 10, wherein the data accessing steps further comprise establishing and updating a random area index table to record information regarding data stored in each of the physical blocks in the random area.

14. The controller according to claim 10, wherein the data accessing steps further comprise generating a mark in a record corresponding to the first physical block in a logical-physical block mapping table to indicate that the new data is temporarily written into the one of the physical blocks in the random area when the new data is temporarily written into the one of the physical blocks in the random area.

15. The controller according to claim 10, wherein the data accessing steps further comprise selecting at least one of the physical blocks from the spare area and writing data stored in at least one of the physical blocks in the random area and valid data stored in a corresponding physical block in the data area into the at least one physical block selected from the spare area when the physical blocks in the random area are all written.

16. The controller according to claim 10, wherein the step of logically grouping the physical blocks into the data area, the spare area, and the random area comprises:
dividing the physical blocks into a plurality of zones; and
individually grouping the physical blocks in each of the zones into the data area, the spare area, and the random area.

17. The controller according to claim 16, wherein the random areas in the zones respectively have different numbers of physical blocks.

18. The controller according to claim 10, wherein the flash memory storage system is a flash drive, a flash memory card, or a solid state drive (SSD).

19. A storage system, comprising:
a flash memory, comprising a plurality of physical blocks;
a connector; and
a controller, electrically connected to the flash memory and the connector, wherein the controller executes a plurality of machine instructions of a memory management module to perform a plurality of data accessing steps, and the data accessing steps comprise:
logically grouping the physical blocks into a data area, a spare area, and a random area;
configuring a plurality of logical blocks to map to the physical blocks of the data area;
determining whether a new data is a continuous data when a write command and the new data are received from a host, wherein the new data belongings to a first logical block among the logical blocks and a first physical block among the physical blocks of the data area maps to the first logical block;
selecting one of the physical blocks from the spare area to serve as a substitute physical block corresponding to the first physical block and writing the new data into the substitute physical block when the new data is the continuous data;
determining whether a number of physical blocks serving as the substitute physical block is a predetermined number when the new data is not the continuous data
temporarily writing the new data into the one of the physical blocks in the random area when the number of the physical blocks serving as the substitute physical block is the predetermined number, wherein the one of the physical blocks in the random area stores data belonging to a plurality of logical blocks among the logical blocks; and
selecting one of the physical blocks from the spare area as the substitute physical block corresponding to the first physical block and writing the new data into the substitute physical block when the number of the substitute physical block is not the predetermined number.

20. The storage system according to claim 19, wherein the step of determining whether the new data is the continuous data comprises determining that the new data is not the continuous data when a quantity of the new data is smaller than a predetermined value.

21. The storage system according to claim 19, wherein the data accessing steps further comprise determining whether there is the substitute physical block corresponding to the first physical block before determining whether the new data is the continuous data,
wherein when there is the substitute physical block corresponding to the first physical block, the new data is written into the substitute physical block corresponding to the first physical block.

22. The storage system according to claim 19, wherein the data accessing steps further comprise establishing and updating a random area index table to record information regarding data stored in each of the physical blocks in the random area.

23. The storage system according to claim 19, wherein the data accessing steps further comprise generating a mark in a record corresponding to the first physical block in a logical-physical block mapping table to indicate that the new data is temporarily written into the one of the physical blocks in the random area when the new data is temporarily written into the one of the physical blocks in the random area.

* * * * *